United States Patent
Lee et al.

(10) Patent No.: US 7,033,685 B2
(45) Date of Patent: Apr. 25, 2006

(54) HIGH COERCIVITY PERPENDICULAR MAGNETIC RECORDING MEDIA ON POLYMER SUBSTRATES

(75) Inventors: Jean L. Lee, San Jose, CA (US); Thomas P. Nolan, Mountain View, CA (US); Hong Ying Wang, Fremont, CA (US); Gary C. Rauch, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/679,419

(22) Filed: Oct. 7, 2003

(65) Prior Publication Data

US 2005/0074633 A1    Apr. 7, 2005

(51) Int. Cl.
*G11B 5/667*    (2006.01)
*G11B 5/673*    (2006.01)

(52) U.S. Cl. .................. 428/828; 428/829; 428/831.2; 427/599

(58) Field of Classification Search ....... 428/694 MM, 428/694 TM, 694 T, 694 TS, 694 TP, 694 TC, 428/457
See application file for complete search history.

(56) References Cited

U.S. PATENT DOCUMENTS

| | | | | |
|---|---|---|---|---|
| 4,687,712 A | * | 8/1987 | Sugita et al. ................ | 428/611 |
| 4,745,005 A | | 5/1988 | Sugita et al. | |
| 5,466,308 A | * | 11/1995 | Fujimura et al. ........... | 148/302 |
| 5,834,085 A | | 11/1998 | Lairson et al. | |
| 6,066,380 A | * | 5/2000 | Oyanagi et al. ............ | 428/64.1 |
| 6,866,948 B1 | * | 3/2005 | Koda et al. ............. | 428/694 TS |
| 2001/0019786 A1 | * | 9/2001 | Ikeda .................. | 428/694 TM |
| 2002/0028355 A1 | * | 3/2002 | Nakamura et al. ... | 428/694 TM |
| 2002/0028357 A1 | * | 3/2002 | Shukh et al. ......... | 428/694 TM |
| 2002/0058159 A1 | * | 5/2002 | Kubota et al. ........ | 428/694 TM |
| 2002/0127433 A1 | * | 9/2002 | Shimizu et al. ....... | 428/694 TM |
| 2003/0022023 A1 | * | 1/2003 | Carey et al. ......... | 428/694 MM |
| 2003/0064253 A1 | * | 4/2003 | Uwazumi et al. ...... | 428/694 TP |
| 2004/0000374 A1 | * | 1/2004 | Watanabe et al. ........... | 156/278 |
| 2004/0072027 A1 | * | 4/2004 | Lu et al. ................ | 428/694 R |
| 2004/0247945 A1 | * | 12/2004 | Chen et al. ............ | 428/694 TS |

OTHER PUBLICATIONS

Kirino et al., IEEE Transactions on Magnetics, vol. 36, No. 5, Sep. 2000, pp. 2348-2350.*

(Continued)

Primary Examiner—Kevin M. Bernatz
(74) Attorney, Agent, or Firm—McDermott Will & Emery LLP

(57) ABSTRACT

A method of manufacturing a perpendicular magnetic recording medium, comprises steps of: (a) providing a substrate of an amorphous thermoplastic polymer material having softening and glass transition temperatures as low as about 95° C.; and (b) forming at least one stack of thin film layers atop at least one surface of the substrate, the at least one layer stack including at least one granular magnetic recording layer of perpendicular type, wherein oxides and/or nitrides provide physical de-coupling of adjacent magnetic grains; and wherein each of the thin film layers is formed by depositing at a substrate temperature not greater than about 70° C., and the coercivity ($H_c$) of the resultant perpendicular magnetic recording medium is at least about 4,000 Oe.

14 Claims, 2 Drawing Sheets

OTHER PUBLICATIONS

Kong et al., IEEE Transactions on Magnetics, vol. 39, No. 5, Sep. 2003, pp. 2338-2340.*

Platt, C., Minor, M., and Klemmer, T., IEEE Trans. Mag., 37(4), 2001, 2302-2304.*

Kraus, L., Haslar, V., and Duhaj, P., IEEE Trans. Mag., 30(2), 1994, 530-532.*

Modern Plastics Handbook (Charles a. Harper, Ed., McGraw-Hill, 2000, Chapter 5.1.1, pp. 5.4-5.8).*

* cited by examiner

HIGH COERCIVITY PERPENDICULAR MAGNETIC RECORDING MEDIA ON POLYMER SUBSTRATES

FIELD OF THE INVENTION

The present invention relates to a method for forming high coercivity perpendicular magnetic recording media on low-cost polymer substrates, and to the media obtained thereby. The invention has particular utility in the manufacture of high areal recording density perpendicular magnetic recording media, e.g., hard disks, utilizing granular-type magnetic recording layers.

BACKGROUND OF THE INVENTION

Magnetic media are widely used in various applications, particularly in the computer industry, and efforts are continually made with the aim of increasing the areal recording density, i.e., bit density of the magnetic media. In this regard, so-called "perpendicular" recording media have been found to be superior to the more conventional "longitudinal" media in achieving very high bit densities. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

Efficient, high bit density recording utilizing a perpendicular magnetic medium requires interposition of a relatively thick (as compared with the magnetic recording layer), magnetically "soft" underlayer ("SUL") layer, i.e., a magnetic layer having a relatively low coercivity of about 1 kOe or below, such as of a NiFe alloy (Permalloy), between the non-magnetic substrate, e.g., of glass, aluminum (Al) or an Al-based alloy, and the magnetically "hard" recording layer having relatively high coercivity of several kOe, e.g., of a cobalt-based alloy (e.g., a Co—Cr alloy such as CoCrPtB) having perpendicular anisotropy. The magnetically soft underlayer serves to guide magnetic flux emanating from the head through the hard, perpendicular magnetic recording layer.

A typical conventional perpendicular recording system 10 utilizing a vertically oriented magnetic medium 1 with a relatively thick soft magnetic underlayer, a relatively thin hard magnetic recording layer, and a single-pole head, is illustrated in FIG. 1, wherein reference numerals 2, 2A, 3, 4, 5, 11, and 12, respectively, indicate a non-magnetic substrate, an adhesion layer (optional), a soft magnetic underlayer, at least one non-magnetic interlayer, at least one perpendicular hard magnetic recording layer, a protective overcoat layer, and a lubricant topcoat layer. Reference numerals 7 and 8, respectively, indicate the single and auxiliary poles of a single-pole magnetic transducer head 6. The relatively thin interlayer 4 (also referred to as an "intermediate" layer), comprised of one or more layers of non-magnetic materials, serves to (1) prevent magnetic interaction between the soft underlayer 3 and the at least one hard recording layer 5 and (2) promote desired microstructural and magnetic properties of the at least one hard recording layer.

As shown by the arrows in the figure indicating the path of the magnetic flux $\phi$, flux $\phi$ is seen as emanating from single pole 7 of single-pole magnetic transducer head 6, entering and passing through the at least one vertically oriented, hard magnetic recording layer 5 in the region above single pole 7, entering and travelling along soft magnetic underlayer 3 for a distance, and then exiting therefrom and passing through the at least one perpendicular hard magnetic recording layer 5 in the region above auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of polycrystalline layers 4 and 5 of the layer stack constituting medium 1. Since magnetically hard main recording layer 5 is epitaxially formed on interlayer 4, the grains of each polycrystalline layer are of substantially the same width (as measured in a horizontal direction) and in vertical registry (i.e., vertically "correlated" or aligned). Completing the layer stack is a protective overcoat layer 11, such as of a diamond-like carbon (DLC), formed over hard magnetic layer 5, and a lubricant topcoat layer 12, such as of a perfluoropolyethylene material, formed over the protective overcoat layer.

Substrate 2 is typically disk-shaped and comprised of a non-magnetic material capable of withstanding the elevated temperatures typically required for deposition thereon of the various constituent layers of the media, as described supra. Typical substrates, therefore, include non-magnetic metals or alloys, e.g., Al or Al-based alloys, such as Al—Mg having an Ni—P plating layer on the deposition surface thereof, or substrate 2 is comprised of a suitable glass, ceramic, glass-ceramic material, or a composite or laminate of these materials. Optional adhesion layer 2A, if present, may comprise an up to about 30 Å thick layer of a material such as Ti or a Ti alloy or Cr or a Cr alloy; soft magnetic underlayer 3 is typically comprised of an about 500 to about 4,000 Å thick layer of a soft magnetic material selected from the group consisting of Ni, NiFe (Permalloy), Co, CoZr, CoZrCr, CoZrNb, CoFeZrNb, CoFe, Fe, FeN, FeSiAl, FeSiAlN, FeCoB, FeCoC, etc.; interlayer 4 typically comprises an up to about 300 Å thick layer or layers of non-magnetic material(s), such as Ru, TiCr, Ru/CoCr$_{37}$Pt$_6$, RuCr/CoCrPt, etc.; and the at least one hard magnetic layer 5 is typically comprised of an about 100 to about 250 Å thick layer(s) of Co-based alloy(s) including one or more elements selected from the group consisting of Cr, Fe, Ta, Ni, Mo, Pt, V, Nb, Ge, B, and Pd, iron nitrides or oxides, or a (CoX/Pd or Pt)$_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, Pt, W, and Fe, and each of the alternating thin, non-magnetic layers of Pd or Pt is up to about 10 Å thick. Each type of hard magnetic recording layer material has perpendicular anisotropy arising from magneto-crystalline anisotropy ($1^{st}$ type) and/or interfacial anisotropy ($2^{nd}$ type).

The continuing trend toward the manufacture of very low cost (e.g., <$500) personal computers (PCs) necessitates a reduction in the cost of hard disk drives utilized in such computers, while at the same time, the escalating requirements for increased areal recording density necessitate further development of high bit density magnetic recording media, e.g., perpendicular-type media.

Accordingly, the use of lower cost materials, e.g., polymers, glass, ceramics, and glass-ceramic composite materials, as replacements for the conventional Al alloy-based substrates for magnetic disk media has been proposed. However, only materials such as glass, glass-ceramic composite materials, and high cost, high temperature-resistant polymer materials which are capable of withstanding the elevated temperatures to which the substrates are subjected during conventional manufacturing processing for depositing the various constituent layers of the media (e.g., high temperature sputter deposition of the magnetic recording layer(s)), have been successfully utilized for the manufacture of practical disk media. Of these candidate substrate materials, the extreme difficulty associated with grinding and lapping of glass and glass-ceramic composite materials have limited their use to higher cost applications, such as mobile disk drives for "notebook" type computers, and the high cost of the high temperature-resistant polymer materials renders them unsuitable for lower cost disk drive applications.

In view of the foregoing, there exists a need for improved, lower cost high areal recording density perpendicular magnetic recording media utilizing low cost, readily available polymer substrate materials, and methodology for manufacturing same. In addition, there exists a need for improved, lower cost hard disk drives and systems including the lower cost polymer substrate-based magnetic recording media.

The present invention addresses and solves problems attendant upon the design and manufacture of lower cost, high recording density, high performance perpendicular magnetic recording media and disk drive systems incorporating same, while maintaining full compatibility with all aspects of conventional disk drive technology and manufacturing processing. Moreover, the present invention enables the manufacture of such hard disk media and disk drive systems at significantly reduced cost, relative to conventional technology and methodology, thereby contributing substantially toward achieving the aim of manufacture of very low cost computers.

DISCLOSURE OF THE INVENTION

An advantage of the present invention is an improved perpendicular magnetic recording medium.

Another advantage of the present invention is an improved perpendicular magnetic recording medium including a low cost polymer substrate.

Yet another advantage of the present invention is an improved granular type perpendicular magnetic recording medium.

Still another advantage of the present invention is an improved granular type perpendicular magnetic recording medium including a low cost polymer substrate.

A further advantage of the present invention is an improved method of manufacturing a perpendicular magnetic recording medium.

A still further advantage of the present invention is an improved method of manufacturing a perpendicular magnetic recording medium including a low cost polymer substrate.

A yet further advantage of the present invention is an improved method of manufacturing granular type perpendicular magnetic recording medium.

Still another advantage of the present invention is an improved method of manufacturing granular type perpendicular magnetic recording medium including a low cost polymer substrate.

Further advantages of the present invention include improved perpendicular magnetic recording media with low cost polymer substrates, manufactured according to the improved methods of the invention.

Additional advantages and other features of the present invention will be set forth in the description which follows and in part will become apparent to those having ordinary skill in the art upon examination of the following or may be learned from the practice of the invention. The advantages of the invention may be realized and obtained as particularly pointed out in the appended claims.

According to an aspect of the invention, the foregoing and other advantages are obtained in part by a perpendicular magnetic recording medium, comprising:

(a) a substrate of an amorphous thermoplastic polymer material having softening and glass transition temperatures greater than about 95° C.; and (b) at least one stack of thin film layers formed on at least one surface of the substrate, the at least one layer stack including at least one granular magnetic recording layer of perpendicular type;

wherein the coercivity ($H_c$) of the perpendicular magnetic recording medium is at least about 4,000 Oe.

In accordance with preferred embodiments of the present invention, the substrate is comprised of at least one amorphous thermoplastic polymer material, selected from the group consisting of: polycarbonates (PCs), polyolefins (POs), polyetherimides (PEIs), polysulfones (PSUs), and polyethersulfones (PESs); and the substrate may be comprised of homopolymers, copolymers, terpolymers, or blends of at least one of the aforementioned thermoplastic polymers.

According to embodiments of the invention, the at least one layer stack includes, in order from the at least one surface of the substrate:

($b_1$) a combined seed/adhesion layer;
($b_2$) at least one soft magnetic underlayer;
($b_3$) at least one non-magnetic interlayer;
($b_4$) at least one granular perpendicular hard magnetic recording layer, wherein oxides and/or nitrides provide physical de-coupling between adjacent magnetic grains; and
($b_5$) a protective overcoat layer.

Preferred embodiments of the present invention include those wherein:

the combined seed/adhesion layer comprises at least one material selected from the group consisting of: a silicon nitride, Ti, Cr, Ti—Cr alloys, Cr—W alloys, Al, non-magnetic Ni—Al alloys, Mo, Nb, Ta, and other non-magnetic refractory metals;

the at least one soft magnetic underlayer comprises a material selected from the group consisting of Ni, NiFe (Permalloy), Co, CoZr, CoZrCr, CoFeZrNb, CoFe, Fe, FeN, FeSiAl, FeSiAlN, FeCoB, and FeCoC;

the at least one non-magnetic interlayer comprises a non-magnetic material selected from the group consisting of Ru, Ti, Ru, Re, and alloys thereof;

the at least one granular perpendicular hard magnetic recording layer comprises a Co-based alloy selected from the group consisting of Co—Pt, Co—Cr, and Co—Cr—Pt; and the protective overcoat layer comprises carbon (C).

Especially preferred embodiments of the present invention include those wherein:

the combined seed/adhesion layer comprises Ti or a silicon nitride/Cr bi-layer;

the at least one soft magnetic underlayer comprises $FeCo_{30.6}B_{12.5}$;

the at least one non-magnetic interlayer comprises Ru; and the at least one granular perpendicular hard magnetic recording layer comprises $CoPt_{18}$; and wherein:

the at least one non-magnetic underlayer comprises first and second Ru layers, the first Ru layer being adjacent the soft magnetic underlayer and sputter-deposited to a lesser thickness than the second Ru layer, in a lower inert gas pressure atmosphere than that utilized for sputter-depositing the second Ru layer.

Additional preferred embodiments of the present invention include those wherein the at least one layer stack includes, in order from the at least one surface of the substrate:

($b_1$) a combined seed/adhesion layer;

($b_2$) a plurality of stacked soft magnetic underlayer/wetting layer pairs;

($b_3$) a soft magnetic underlayer;

($b_4$) at least one non-magnetic interlayer;

($b_5$) at least one granular perpendicular hard magnetic recording layer, wherein oxides and/or nitrides provide physical de-coupling between adjacent magnetic grains; and ($b_6$) a protective overcoat layer; wherein:

the combined seed/adhesion layer comprises at least one material selected from the group consisting of: a silicon nitride, Ti, Cr, Ti—Cr alloys, Cr—W alloys, Al, non-magnetic Ni—Al alloys, Mo, Nb, Ta, and other non-magnetic refractory metals;

the plurality of stacked soft magnetic underlayer/wetting layer pairs comprises n stacked layer pairs, where n is an integer from 1 to 5, each soft magnetic underlayer comprising a material selected from the group consisting of Ni, NiFe (Permalloy), Co, CoZr, CoZrCr, CoFeZrNb, CoFe, Fe, FeN, FeSiAl, FeSiAlN, FeCoB, and FeCoC; and each wetting layer comprising a material selected from the group consisting of Ag, Cu, Au, Ta, Cr, and alloys thereof;

the soft magnetic underlayer comprises a material selected from the group consisting of Ni, NiFe (Permalloy), Co, CoZr, CoZrCr, CoFeZrNb, CoFe, Fe, FeN, FeSiAl, FeSiAlN, FeCoB, and FeCoC;

the at least one non-magnetic interlayer comprises a non-magnetic material selected from the group consisting of Ru, Ti, Ru, Re, and alloys thereof;

the at least one granular perpendicular hard magnetic recording layer comprises a Co-based alloy selected from the group consisting of Co—Pt, Co—Cr, and Co—Cr—Pt; and the protective overcoat layer comprises carbon (C).

Another aspect of the present invention is a method of manufacturing a perpendicular magnetic recording medium, comprising steps of:

(a) providing a substrate of an amorphous thermoplastic polymer material having softening and glass transition temperatures greater than about 95° C.; and (b) forming at least one stack of thin film layers atop at least one surface of the substrate, the at least one layer stack including at least one granular magnetic recording layer of perpendicular type, wherein each of the thin film layers is formed by depositing at a substrate temperature not greater than about 70° C., and the coercivity ($H_c$) of said perpendicular magnetic recording medium is at least about 4,000 Oe.

According to preferred embodiments of the present invention, step (a) comprises providing a substrate comprising at least one amorphous thermoplastic material selected from the group consisting of: polycarbonates (PCs), polyolefins (POs), polyetherimides (PEIs), polysulfones (PSUs), and polyethersulfones (PESs); and the substrate may comprise homopolymers, copolymers, terpolymers, or blends of at least one of the aforementioned thermoplastic polymers; and step (b) comprises sputter-depositing each layer of the at least one stack of thin film layers, wherein the at least one granular perpendicular magnetic recording layer is formed by sputtering a target in a reactive gas atmosphere including at least one of oxygen ($O_2$) gas and nitrogen ($N_2$) gas.

Embodiments of the present invention include those wherein step (b) comprises forming the at least one layer stack to include, in order from the at least one surface of the substrate:

a combined seed/adhesion layer;

at least one soft magnetic underlayer;

at least one non-magnetic interlayer;

at least one granular perpendicular hard magnetic recording layer, wherein oxides and/or nitrides provide physical de-coupling of adjacent magnetic grains; and a protective overcoat layer.

Preferred embodiments of the present invention include those wherein:

the combined seed/adhesion layer comprises at least one material selected from the group consisting of: a silicon nitride, Ti, Cr, Ti—Cr alloys, Cr—W alloys, Al, non-magnetic Ni—Al alloys, Mo, Nb, Ta, and other non-magnetic refractory metals;

the at least one soft magnetic underlayer comprises a material selected from the group consisting of Ni, NiFe (Permalloy), Co, CoZr, CoZrCr, CoFeZrNb, CoFe, Fe, FeN, FeSiAl, FeSiAlN, FeCoB, and FeCoC;

the at least one non-magnetic interlayer comprises a non-magnetic material selected from the group consisting of Ru, Ti, Ru, Re, and alloys thereof;

the at least one granular perpendicular hard magnetic recording layer comprises a Co-based alloy selected from the group consisting of Co—Pt, Co—Cr, and Co—Cr—Pt; and the protective overcoat layer comprises carbon (C).

According to especially preferred embodiments of the present invention, the combined seed/adhesion layer comprises Ti or a silicon nitride/Cr bi-layer;

the at least one soft magnetic underlayer comprises $FeCo_{30.6}B_{12.5}$;

the at least one non-magnetic interlayer comprises Ru; and the at least one granular perpendicular hard magnetic recording layer comprises $CoPt_{18}$.

Additional preferred embodiments of the present invention include those wherein:

the at least one non-magnetic underlayer comprises first and second Ru layers, the first Ru layer being adjacent the soft magnetic underlayer and sputter-deposited to a lesser thickness than the second Ru layer, in a lower inert gas pressure atmosphere than that utilized for sputter-depositing the second Ru layer.

Still further preferred embodiments of the present invention include those wherein:

step (b) comprises forming the at least one layer stack to include, in order from the at least one surface of said substrate:

a combined seed/adhesion layer;

a plurality of stacked soft magnetic underlayer/wetting layer pairs;

a soft magnetic underlayer;

at least one non-magnetic interlayer;

at least one granular perpendicular hard magnetic recording layer, wherein oxides and/or nitrides provide physical de-coupling between adjacent magnetic grains; and a protective overcoat layer; wherein:

the combined seed/adhesion layer comprises at least one material selected from the group consisting of: a silicon nitride, Ti, Cr, Ti—Cr alloys, Cr—W alloys, Al, non-magnetic Ni—Al alloys, Mo, Nb, Ta, and other non-magnetic refractory metals;

the plurality of stacked soft magnetic underlayer/wetting layer pairs comprises n stacked layer pairs, where n is an integer from 1 to 5, each soft magnetic underlayer of the layer pairs comprising a material selected from the group consisting of Ni, NiFe (Permalloy), Co, CoZr, CoZrCr, CoFeZrNb, CoFe, Fe, FeN, FeSiAl, FeSiAlN, FeCoB, and FeCoC; and each wetting layer comprising a material selected from the group consisting of Ag, Cu, Au, Ta, Cr, and alloys thereof;

the soft magnetic underlayer comprises a material selected from the group consisting of Ni, NiFe (Permalloy), Co, CoZr, CoZrCr, CoFeZrNb, CoFe, Fe, FeN, FeSiAl, FeSiAlN, FeCoB, and FeCoC;

the at least one non-magnetic interlayer comprises a non-magnetic material selected from the group consisting of Ru, Ti, Ru, Re, and alloys thereof;

the at least one granular perpendicular hard magnetic recording layer comprises a Co-based alloy selected from the group consisting of Co—Pt, Co—Cr, and Co—Cr—Pt; and the protective overcoat layer comprises carbon (C).

Further aspects of the present invention include improved perpendicular magnetic recording media with low cost polymer substrates, manufactured according to the above-described improved methods of the invention.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the present invention can best be understood when read in conjunction with the following drawings, in which the various features are not necessarily drawn to scale but rather are drawn as to best illustrate the pertinent features, and in which like reference numerals are employed throughout for designating similar features, wherein.

DESCRIPTION OF THE INVENTION

The present invention addresses and solves problems attendant upon the design and manufacture of lower cost, high recording density, high performance perpendicular magnetic recording media and disk-based systems, and is based upon the recognition by the inventors that such lower cost, high recording density, high performance perpendicular magnetic recording media can be readily and reliably fabricated by use of granular perpendicular magnetic recording layers, which granular layers can be formed at low temperatures, e.g., room temperature, on low cost, readily available thermoplastic polymer substrates having low softening and glass transition temperatures.

Specifically, the inventors have determined that the ability to form high recording density, high performance (e.g., high coercivity, $H_c$), granular perpendicular magnetic recording layers at nominally room temperatures, as by sputtering of a magnetic alloy target in a reactive atmosphere including at least one of oxygen ($O_2$) gas and nitrogen ($N_2$) gas to form granular perpendicular magnetic recording layers wherein physical de-coupling of adjacent magnetic grains is provided by means of oxides and/or nitrides, can be advantageously utilized with low cost, readily available thermoplastic substrate materials having softening and glass transition temperatures (i.e., greater than about 95° C.), to form lower cost, high coercivity disk media for use in disk-based information storage and retrieval systems.

According to advantageous features of the invention for providing media with high magnetic performance characteristics, e.g., high coercivity (i.e., $H_c \geq 4,000$ Oe) and good squareness S and S* values:

(1) no special treatment, e.g., surface preparation, of the thermoplastic polymer substrate is required prior to formation thereon of the thin film layer stack constituting the media;

(2) a combined seed/adhesion layer may be utilized between the substrate and the layer stack;

(3) a dual non-magnetic interlayer structure (e.g., dual Ru layers) may be provided between the soft magnetic underlayer and granular perpendicular magnetic recording layer for affording optimal magnetic performance;

(4) a variety of Co-based alloys may be utilized for the granular perpendicular magnetic recording layer, e.g., Co—Pt, Co—Cr, Co—Cr—Pt, etc.; and (5) the layer stack may comprise a plurality of stacked pairs of soft magnetic underlayer/wetting layer pairs between the seed/adhesion layer and the soft magnetic underlayer.

Figure 1:
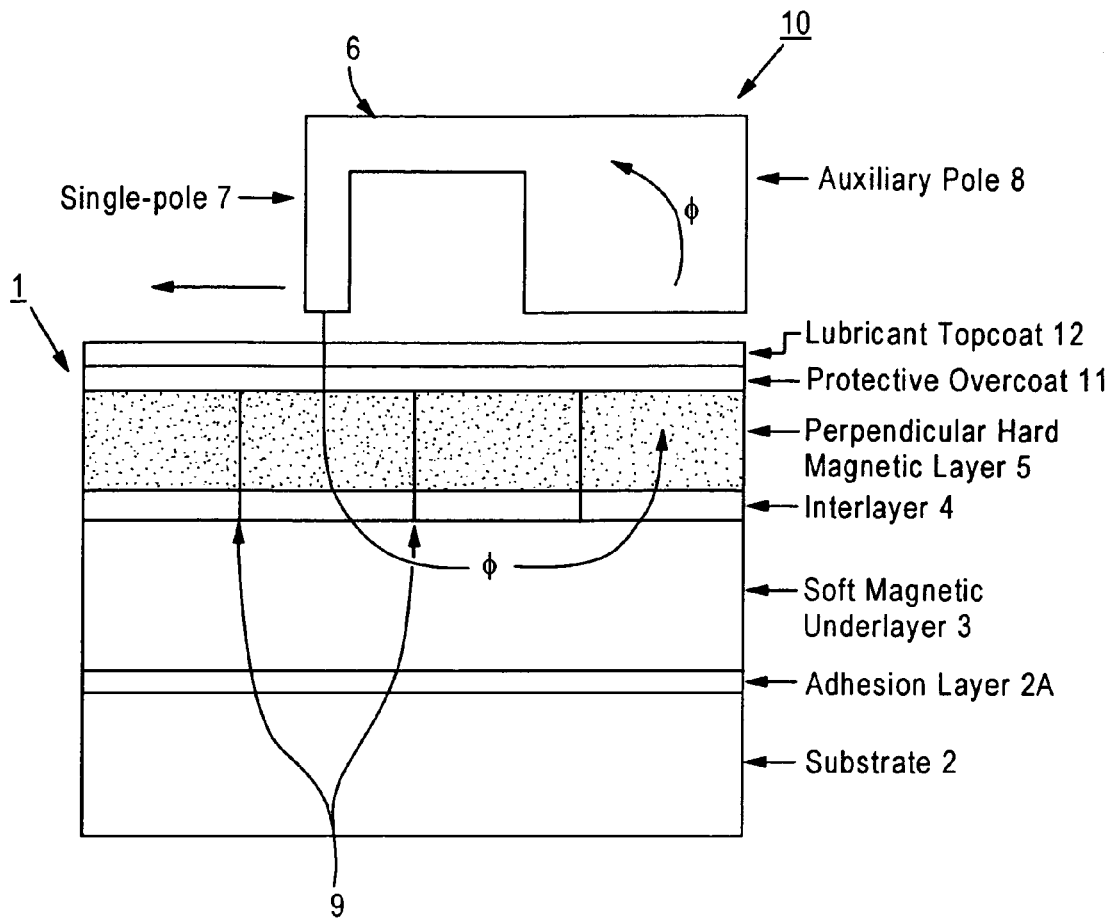
FIG. 1 schematically illustrates, in simplified, cross-sectional view, a portion of a magnetic recording, storage, and retrieval system comprised of a conventional perpendicular-type magnetic recording medium.
Figure 2:
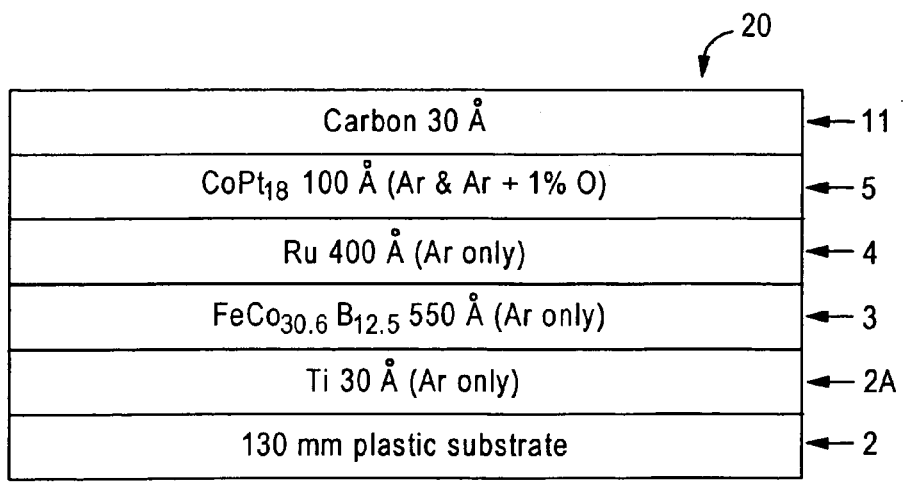
FIG. 2 schematically illustrates, in simplified, cross-sectional view, a portion of a perpendicular-type magnetic recording medium according to an embodiment of the present invention.

Referring now to FIG. 2, schematically illustrated therein, in simplified, cross-sectional view, is a portion of an embodiment of a high coercivity perpendicular-type magnetic recording medium 20 fabricated according to the principles of the present invention. More specifically, perpendicular magnetic recording medium 20 is generally similar to the conventional perpendicular magnetic recording medium 1 of FIG. 1, and comprises a stack of thin-film layers formed on at least one surface of a non-magnetic, thermoplastic polymer substrate 2, and includes, in overlying sequence from the substrate surface, a combined seed/adhesion layer 2A, a soft magnetic underlayer 3, a non-magnetic interlayer 4, a granular, perpendicular hard magnetic recording layer 5, a protective overcoat layer 11, and a lubricant topcoat layer 12.

In accordance with embodiments of the present invention, e.g., as with hard disks, non-magnetic substrate 2 is comprised of a readily available, low cost amorphous thermoplastic material having softening and glass transition temperatures greater than about 95° C., comprised of at least one amorphous thermoplastic polymer material selected from the group consisting of: polycarbonates (PCs), polyolefins (POs), polyetherimides (PEIs), polysulfones (PSUs), and polyethersulfones (PESs). In addition, substrate 2 may be comprised of homopolymers, copolymers, terpolymers, or blends of at least one of the aforementioned thermoplastic polymers.

The thickness of the thermoplastic polymeric substrate 2, when utilized in the manufacture of disk-shaped media, depends upon the particular polymeric material, and is generally selected to provide a rigidity or stiffness at least equal to that provided by an Al alloy-based substrate of the same outer diameter (O.D.) and of conventional thickness for that diameter. By way of illustration only, for polycarbonate substrates, a minimum thickness of about 75 mils is required. The upper limit of disk thickness depends upon a number of factors, including, inter alia, the drive and spindle sizes. The minimum flexural strength of the polymer substrate depends upon the dimensions of the disk: i.e., the thicker the disk, the lower the flexural strength which can be tolerated. For example, with a 2 mm thick polycarbonate substrate having a 65 mm O.D. and a 2 mm inner diameter (I.D.), the minimum flexural strength is ~2.2 GPa. In each of the illustrated embodiments, polycarbonate substrate 2 is about 1.2 mm thick.

Thermoplastic polymeric substrates suitable for use according to the invention may be fabricated according to conventional methodologies, including, for example, injection molding utilizing pellets of the polymer. No special surface treatment of the resultant substrate is required prior to deposition thereon of the thin film layer stack constituting the magnetic recording medium. Nor is a release agent required for facilitating release of the substrate from the mold employed in the injection molding process.

Combined seed/adhesion layer 2A is in overlying contact with the surface of substrate 2 and typically comprises an about 15 to about 80 Å thick layer, preferably from about 25 to about 35 Å thick, of at least one material selected from the group consisting of: a silicon nitride, Ti, Cr, Ti—Cr alloys, Cr—W alloys, Al, non-magnetic Ni—Al alloys, Mo, Nb, Ta, and other non-magnetic refractory metals. Illustratively, combined seed/adhesion layer 2A comprises an about 30 Å thick layer of Ti sputter-deposited onto the surface of substrate 2 at room temperature and in an inert gas (Ar) atmosphere, or a silicon nitride/Cr bi-layer.

Overlying the combined seed/adhesion layer 2A is a soft magnetic underlayer 3, from about 200 to about 2,000 Å thick, preferably from about 300 to about 700 Å thick, of at least one soft magnetic material having a low coercivity below about 1 kOE, selected from the group consisting of Ni, NiFe (Permalloy), Co, CoZr, CoZrCr, CoFeZrNb, CoFe, Fe, FeN, FeSiAl, FeSiAlN, FeCoB, and FeCoC. Illustratively, soft magnetic underlayer 3 comprises an about 550 Å thick layer of $FeCo_{30.6}B_{12.5}$ sputter-deposited onto the surface of the combined seed/adhesion layer 2A at room temperature and in an inert gas (Ar) atmosphere.

Non-magnetic interlayer 4 overlies soft magnetic underlayer 3, is from about 100 to about 700 Å thick, preferably from about 200 to about 500 Å thick, and comprises a non-magnetic material selected from the group consisting of Ru, Ti, Ru, Re, and alloys thereof. Illustratively, non-magnetic interlayer 4 comprises an about 400 Å thick layer of Ru sputter-deposited onto the surface of the soft magnetic underlayer 3 at room temperature and in an inert gas (Ar) atmosphere.

Overlying and in contact with the surface of non-magnetic interlayer 4 is a granular perpendicular hard magnetic recording layer 5, from about 70 to about 300 Å thick, preferably from about 100 to about 250 Å thick, and comprised of a Co-based magnetic alloy, such as, for example, Co—Pt, Co—Cr, Co—Cr—Pt, etc. Granular perpendicular hard magnetic recording layer 5 is distinguished from conventional perpendicular magnetic recording layers in that it is formed by sputtering from a Co-based magnetic alloy target onto a low temperature (e.g., room temperature) substrate, in a sputtering gas mixture consisting of a major amount of an inert gas, e.g., Ar, and minor amounts (e.g., up to about 15% by volume) of at least one reactive gas selected from oxygen ($O_2$) and nitrogen ($N_2$). The presence of the at least one reactive gas during sputtering of the Co-based magnetic alloy target helps to provide physical de-coupling of adjacent magnetic grains of the granular perpendicular hard magnetic recording layer 5, by forming oxides and/or nitrides at the grain boundaries. In contrast with grain de-coupling processes relying upon diffusion of species to the grain boundaries, the reactive sputtering process does not require elevated substrate temperatures during the sputtering or any post-deposition diffusion processing (if required).

Completing the layer stack of medium 20 are protective overcoat layer 11 atop granular perpendicular magnetic recording layer 5, typically comprised of a layer of a carbon (C)-containing material <~100 Å thick, formed by sputtering at room temperature and in an Ar atmosphere, and lubricant topcoat layer 12, typically comprised of a layer of a perfluoropolyethylene compound <~50 Å thick, and formed atop protective overcoat layer 11 by means of a low temperature process, e.g., dipping into a solution of the perfluoropolyethylene compound in a suitable solvent.

According to the invention, as a consequence of the different mechanism of grain de-coupling afforded by formation of granular magnetic recording layers by means of reactive sputtering, lower cost, readily available amorphous thermoplastic polymer materials may be utilized as substrates for hard disk magnetic recording media, wherein each of the constituent thin-film layers (apart from the lubricant topcoat layer 12) may be formed by sputter deposition wherein the substrate is passively cooled and remains at room temperature or at a temperature not greater than about 70° C. throughout deposition of each of the constituent thin film layers.

Illustratively, the non-magnetic constituent thin film layers may be sputtered at Ar pressures ranging from about 5 to about 15 mTorr when utilizing a low-throughput, research-grade sputtering apparatus. The granular perpendicular magnetic layer 5 may be sputtered in such apparatus with 0.1 vol. % $O_2$ and/or $N_2$ added to Ar at 30 mTorr. In instances where a high throughput, production-type sputtering apparatus is employed, the $O_2$ and $N_2$ contents in the Ar may range up to about 10 vol. %, with flow rates in the range from about 5 to about 100 sccm. The target compositions are nominally the same as the sputtered film in each case. DC magnetron sputtering is generally employed, at total powers from about 50 to about 100 W for the low-throughput, research grade sputtering apparatus and up to several hundreds of W for the production-type apparatus. Power densities range from about 1 to about 5 $W/cm^2$ in the research grade apparatus, with target-substrate spacings ranging from about 1 to about 2.5 in.

Figure 3:
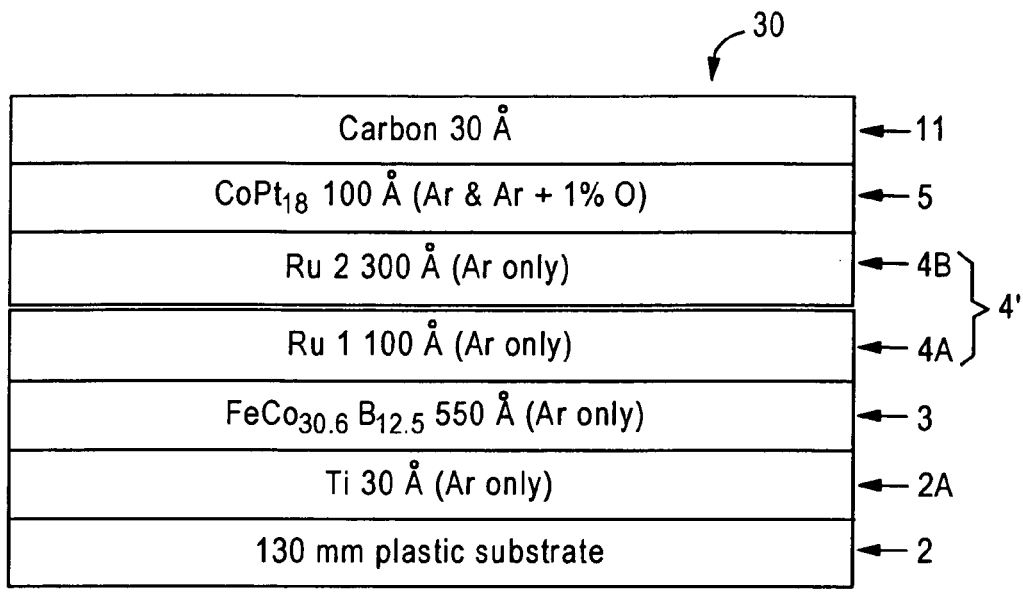
FIG. 3 schematically illustrates, in simplified, cross-sectional view, a portion of a perpendicular-type magnetic recording medium according to another embodiment of the present invention.

Adverting to FIG. 3, schematically illustrated therein, in simplified, cross-sectional view, is a portion of a perpendicular-type magnetic recording medium 30 according to another embodiment of the present invention. Specifically, medium 30 illustrated in FIG. 3 differs from medium 20 shown in FIG. 2 in that the non-magnetic interlayer 4 intermediate soft magnetic underlayer 3 and granular perpendicular hard magnetic recording layer 5 is replaced with a dual layer non-magnetic interlayer structure 4', which dual layer interlayer structure enhances the performance of medium 30. According to this embodiment, the dual layer non-magnetic interlayer structure 4' consists of a first, or lower, non-magnetic interlayer 4A in contact with soft magnetic underlayer 3 and a second, or upper, non-magnetic interlayer 4B in contact with granular perpendicular hard magnetic recording layer 5, wherein the first non-magnetic interlayer 4A is sputter-deposited to a lesser thickness than the second non-magnetic interlayer 4B, and in a lower inert gas pressure atmosphere than that utilized for sputter-depositing the second interlayer. Accordingly, the first non-magnetic interlayer 4A may be sputter-deposited to a thickness from about 50 to about 200 Å, preferably about 100 Å, in an inert gas atmosphere of pressure from about 3 to about 10 mTorr, preferably about 5 mTorr, and the second non-magnetic interlayer 4B may be sputter-deposited to a thickness from about 100 to about 500 Å, preferably about 300 Å, in an inert gas atmosphere of pressure from about 3 to about 30 mTorr, preferably about 15 mTorr. As with the previously described sputter-deposition steps utilized for forming the stack of thin-film layers constituting the inventive media, the temperature of the substrate during formation thereon of layers 4A and 4B is at or near ambient temperature, i.e., room temperature, or up to about 70° C.

By way of illustration, but not limitation, the first, or lower, non-magnetic interlayer 4A may comprise an about 100 Å thick layer of Ru sputter-deposited in a 5–10 mTorr Ar atmosphere and the second, or upper, non-magnetic interlayer 4B may comprise an about 300 Å thick layer of Ru sputter-deposited in a 10–15 mTorr Ar atmosphere, with the substrate being at about room temperature in each case.

Figure 4:
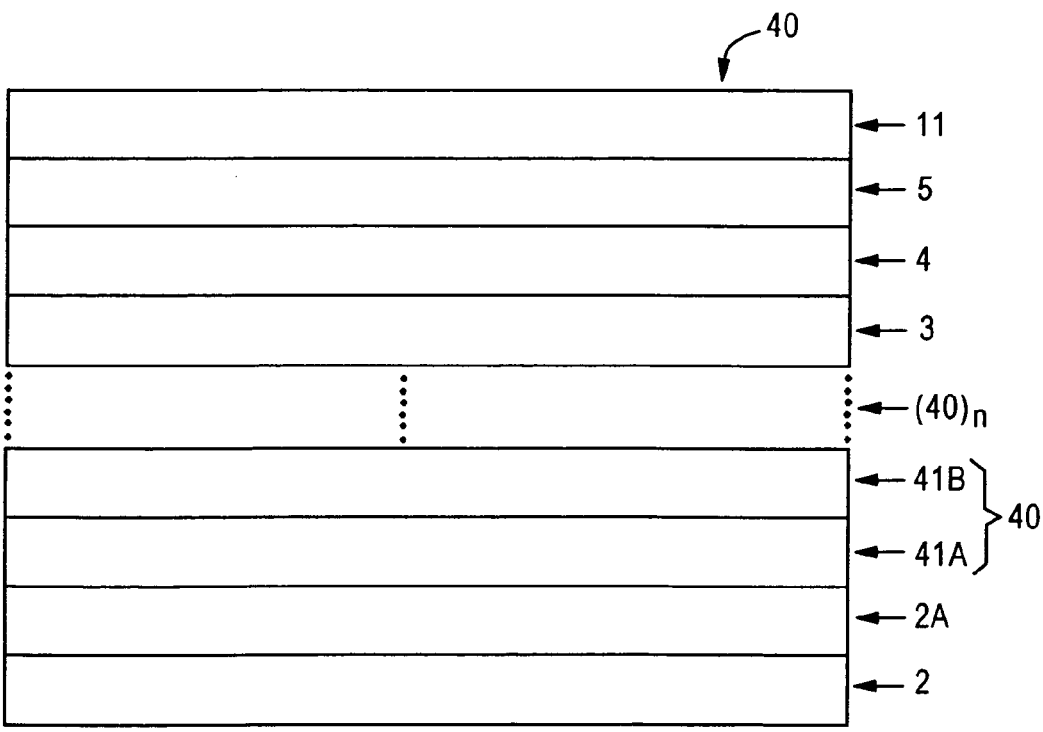
FIG. 4 schematically illustrates, in simplified, cross-sectional view, a portion of a perpendicular-type magnetic recording medium according to yet another embodiment of the present invention.

Referring now to FIG. 4, schematically illustrated therein, in simplified, cross-sectional view, is a portion of a perpendicular-type magnetic recording medium 40 according to yet another embodiment of the present invention, wherein a layer pair structure 41 consisting of plurality of stacked soft magnetic underlayers 41A and wetting layers 41B is present intermediate seed/adhesion layer 2A and soft magnetic underlayer 3, the plurality of stacked soft magnetic underlayer/wetting layer pairs comprising n stacked layer pairs, where n is an integer from 1 to 5, each soft magnetic underlayer 41A is from about 200 to about 700 Å thick, preferably about 500 Å thick, and comprised of a material selected from the group consisting of Ni, NiFe (Permalloy), Co, CoZr, CoZrCr, CoFeZrNb, CoFe, Fe, FeN, FeSiAl, FeSiAlN, FeCoB, and FeCoC; and each wetting layer 41B is from about 10 to about 50 Å thick, preferably about 25 Å thick, and comprised of a material selected from the group consisting of Ag, Cu, Au, Ta, Cr, and alloys thereof.

The efficacy of the invention will now be demonstrated by reference to the following examples:

EXAMPLE 1

Granular perpendicular magnetic recording media comprising polycarbonate and glass substrates (for comparison) of the following structure were fabricated by means of sputter deposition techniques, wherein the substrate was at or near room temperature during each sputter deposition step:

130 mm polycarbonate or glass substrate//30 Å Ti seed/adhesion layer, sputtered in Ar only//550 Å $FeCo_{30.6}B_{12.5}$ soft magnetic underlayer, sputtered in Ar only//400 Å Ru non-magnetic interlayer, sputtered in Ar only//100 Å $CoPt_{18}$ granular perpendicular hard magnetic recording layer, sputtered in Ar+1% $O_2$//30 Å C protective overcoat layer, sputtered in 50 vol. % Ar/50 vol. % $H_2$.

Kerr M-H hysteresis loop data comparing the magnetic performance characteristics of the above-configured granular perpendicular recording media are given in Table I below:

TABLE I

| Substrate | $H_c$ (Oe) | $H_n$ (Oe) | S | S* |
|---|---|---|---|---|
| Glass | 6471 | 3090 | 0.984 | 0.486 |
| Polycarbonate | 5266 | 3605 | 0.980 | 0.691 |

The magnetic performance data of Table I demonstrate that, while there is some degradation in the magnetic properties when the granular perpendicular media are fabricated on polymeric, i.e., polycarbonate, substrates rather than glass substrates, the magnitude of the degradation is sufficiently small as to not preclude the use of polymeric substrates for fabrication of high areal density perpendicular magnetic recording media for low cost, mass consumer applications.

EXAMPLE 2

A series of granular perpendicular magnetic recording media of layer structure similar to that of the media of Example 1 was fabricated, wherein, as in the previous Example, each of the constituent layers, except for the granular perpendicular hard magnetic recording layer, was sputter-deposited in an Ar atmosphere only, with the substrate temperature being at or near room temperature during each sputter deposition step, and the non-magnetic interlayer consisted of a 400 Å thick single Ru layer or a first, or lower, 100 Å thick Ru layer ("Ru 1" in the following Table II) and a thicker second, or upper, 300 Å thick Ru layer ("Ru 2" in Table II) sputter-deposited in a higher pressure Ar atmosphere than that utilized for Ru 1. Kerr M-H hysteresis loop data comparing the magnetic performance characteristics of the above-configured granular perpendicular recording media are summarized in Table II below:

TABLE II

| Disk | | Ar Pressure | | $CoPt_{18}$ | | | | |
|---|---|---|---|---|---|---|---|---|
| I.D. # | Substrate | Ru 1 | Ru 2 | Ar + 0.1% $O_2$ | $H_c$ (Oe) | $H_n$ (Oe) | S | S* |
| x3915-11 | glass | 5 mTorr | 10 mTorr | 30 mTorr | 5152 | 3696 | 0.967 | 0.727 |
| x3915-12 | glass | 5 mTorr | 15 mTorr | 30 mTorr | 6471 | 3090 | 0.984 | 0.486 |
| x3915-13 | glass | 10 mTorr | 15 mTorr | 30 mTorr | 5664 | 2681 | 0.900 | 0.526 |

TABLE II-continued

| Disk | | Ar Pressure | | CoPt$_{18}$ | | | | |
|---|---|---|---|---|---|---|---|---|
| I.D. # | Substrate | Ru 1 | Ru 2 | Ar + 0.1% O$_2$ | H$_c$ (Oe) | H$_n$ (Oe) | S | S* |
| x3915-251 | polycarbonate | 10 mTorr | N/A | 30 mTorr | 4899 | 3366 | 1.089 | 0.661 |
| x3915-254 | polycarbonate | 5 mTorr | 15 mTorr | 30 mTorr | 5266 | 3605 | 0.980 | 0.691 |

As with the data of Table I, the data of Table II demonstrate that, when the granular perpendicular media are fabricated on polymeric, i.e., polycarbonate, substrates rather than glass substrates, the resultant magnetic performance characteristics are generally comparable to those of media fabricated on glass substrates. As a consequence, the use of polymeric substrates for fabrication of high areal density perpendicular magnetic recording media for low cost, mass consumer applications is not precluded. In addition, the data demonstrate the superior performance of media fabricated with a pair of Ru non-magnetic interlayers, compared to media with a single Ru layer.

Thus, the present invention advantageously provides improved, low cost, high areal density, granular-type perpendicular magnetic data/information and storage retrieval media including readily available, low cost thermoplastic polymeric substrates, and methodology for manufacturing same, which methodology affords the media with improved performance characteristics vis-à-vis prior perpendicular media fabricated on low cost thermoplastic polymeric substrates. The media of the present invention are especially useful when employed in conjunction with single-pole recording/retrieval transducer heads and enjoy particular utility in high recording density systems for lower cost computer-related applications. In addition, the inventive media can be fabricated by means of conventional media manufacturing technologies, e.g., sputtering.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A perpendicular magnetic recording medium, comprising:
    (a) a substrate of an amorphous thermoplastic polymer material having softening and glass transition temperatures greater than about 95° C.; and
    (b) at least one stack of thin film layers formed on at least one surface of said substrate, said at least one layer stack including in order from said at least one surface of said substrate
    at least one soft magnetic underlayer;
    at least one non-magnetic interlayer, and at least one granular perpendicular magnetic recording layer wherein
    said at least one non-magnetic interlayer comprises first and second Ru layers, said first Ru layer being adjacent said soft magnetic underlayer and sputter-deposited to a lesser thickness than said second Ru layer and in a lower inert gas pressure atmosphere than that utilized for sputter-depositing said second Ru layer.

2. The medium as in claim 1, wherein:
said substrate comprises at least one amorphous thermoplastic material selected from the group consisting of: polycarbonates (PCs), polyolefins (POs), polyetherimides (PEIs), polysulfones (PSUs), and polyethersulfones (PESs).

3. The medium as in claim 1, wherein:
said substrate comprises homopolymers, copolymers, terpolymers, or blends of at least one material selected from the group consisting of polycarbonates (PCs), polyolefins (POs), polyetherimides (PEIs), polysulfones (PSUs), and polyethersulfones (PESs).

4. The medium as in claim 1, wherein:
said at least one layer stack includes, in order from said at least one surface of said substrate:
    (b$_1$) a combined seed/adhesion layer;
    (b$_2$) said at least one soft magnetic underlayer;
    (b$_3$) said at least one non-magnetic interlayer;
    (b$_4$) said at least one granular perpendicular hard magnetic recording layer, wherein oxides and/or nitrides provide physical de-coupling between adjacent magnetic grains; and
    (b$_5$) a protective overcoat layer.

5. The medium as in claim 4, wherein:
said combined seed/adhesion layer comprises at least one material selected from the group consisting of: a silicon nitride, Ti, Cr, Ti—Cr alloys, Cr—W alloys, Al, non-magnetic Ni—Al alloys, Mo, Nb, Ta, and other non-magnetic refractory metals;
said at least one non-magnetic interlayer further comprises a non-magnetic material selected from the group consisting of Ti, Re, and alloys thereof;
said at least one granular perpendicular hard magnetic recording layer comprises a Co-based alloy selected from the group consisting of Co—Pt, Co—Cr, and Co—Cr—Pt; and
said protective overcoat layer comprises carbon (C).

6. The medium as in claim 5, wherein:
said combined seed/adhesion layer comprises Ti or a silicon nitride/Cr bi-layer;
said at least one soft magnetic underlayer comprises FeCoB; and
said at least one granular perpendicular hard magnetic recording layer comprises CoPt$_{18}$.

7. The perpendicular magnetic recording medium of claim 6, wherein said FeCoB comprises FeCo$_{30.6}$B$_{12.5}$.

8. The perpendicular recording medium of claim 1, wherein the coercivity (Hc) of said perpendicular magnetic recording medium is at least about 4,000 Oe.

9. The medium as in claim 1, wherein:
said at least one layer stack includes, in order from said at least one surface of said substrate:
($b_1$) a combined seed/adhesion layer;
($b_2$) a plurality of stacked soft magnetic underlayer/wetting layer pairs;
($b_3$) said soft magnetic underlayer;
($b_4$) said at least one non-magnetic interlayer;
($b_5$) said at least one granular perpendicular hard magnetic recording layer, wherein oxides and/or nitrides provide physical de-coupling between adjacent magnetic grains; and
($b_6$) a protective overcoat layer.

10. The medium as in claim 9, wherein:
said combined seed/adhesion layer comprises at least one material selected from the group consisting of: a silicon nitride, Ti, Cr, Ti—Cr alloys, Cr—W alloys, Al, non-magnetic Ni—Al alloys, Mo, Nb, Ta, and other non-magnetic refractory metals;
said plurality of stacked soft magnetic underlayer/wetting layer pairs comprises n stacked layer pairs, where n is an integer from 1 to 5;
each wetting layer comprising a material selected from the group consisting of Ag, Cu, Au, Ta, Cr, and alloys thereof
said at least one non-magnetic interlayer further comprises a non-magnetic material selected from the group consisting of Ti, Re, and alloys thereof;
said at least one granular perpendicular hard magnetic recording layer comprises a Co-based alloy selected from the group consisting of Co—Pt, Co—Cr, and Co—Cr—Pt; and
said protective overcoat layer comprises carbon (C).

11. A perpendicular magnetic recording medium manufactured by a method comprising steps of:

(a) providing a substrate of an amorphous thermoplastic polymer material having softening and glass transition temperatures greater than about 95° C.; and (b) forming at least one stack of thin film layers atop at least one surface of said substrate, said at least one layer stack including at least one granular perpendicular magnetic recording layer, wherein each of said thin film layers of said stack is formed by depositing at a substrate temperature not greater than about 70° C.; wherein step (b) comprises forming said at least one layer stack to include in order on said at least one surface of said substrate, at least one soft magnetic underlayer, at least one non-magnetic interlayer, and said at least one granular perpendicular magnetic recording layer wherein said at least one non-magnetic interlayer comprises first and second Ru layers, said first Ru layer being adjacent said soft magnetic underlayer and sputter-deposited to a lesser thickness than said second Ru layer and in a lower inert gas pressure atmosphere than that utilized for sputter-depositing said second Ru layer.

12. The perpendicular magnetic recording medium according to claim 11, wherein said at least one soft magnetic underlayer comprises FeCoB.

13. The perpendicular magnetic recording medium according to claim 12, wherein said at least one soft magnetic underlayer comprising FeCoB comprises $FeCo_{30.6}B_{12.5}$.

14. The perpendicular magnetic recording medium of claim 11, wherein the coercivity ($H_c$) of said perpendicular magnetic recording medium is at least about 4,000 Oe.

* * * * *